United States Patent
Gillespie et al.

(10) Patent No.: US 7,633,989 B2
(45) Date of Patent: Dec. 15, 2009

(54) HIGH PULSE REPETITION RATE GAS DISCHARGE LASER

(75) Inventors: Walter D. Gillespie, Poway, CA (US); Thomas D. Steiger, San Diego, CA (US); Richard C. Ujazdowski, Poway, CA (US); William N. Partlo, Poway, CA (US)

(73) Assignee: Cymer, Inc., San Diego, CA (US)

( * ) Notice: Subject to any disclaimer, the term of this patent is extended or adjusted under 35 U.S.C. 154(b) by 174 days.

(21) Appl. No.: 11/169,203

(22) Filed: Jun. 27, 2005

(65) Prior Publication Data

US 2006/0291517 A1    Dec. 28, 2006

(51) Int. Cl.
*H01S 3/22*    (2006.01)
(52) U.S. Cl. .............................. 372/55; 372/58; 372/61; 372/87
(58) Field of Classification Search .................. 372/55, 372/58, 61, 87
See application file for complete search history.

(56) References Cited

U.S. PATENT DOCUMENTS

| | | | |
|---|---|---|---|
| 3,828,277 A | 8/1974 | Otto et al. .................. | 331/94.5 |
| 4,245,194 A | 1/1981 | Fahlen et al. ............... | 331/94.5 |
| 4,414,488 A | 11/1983 | Hoffman et al. .............. | 315/39 |
| 4,546,482 A | 10/1985 | Bagaglia et al. ............... | 372/86 |
| 4,547,886 A | 10/1985 | Kaminski et al. ............. | 372/59 |
| 4,686,682 A | 8/1987 | Haruta et al. ................. | 372/87 |
| 4,703,490 A | 10/1987 | Brumme et al. ............... | 372/86 |
| 4,774,714 A | 9/1988 | Javan ......................... | 372/109 |
| 4,837,773 A | 6/1989 | Wakata et al. ................. | 372/86 |
| 4,876,693 A | 10/1989 | Lucero et al. ................. | 372/82 |
| 4,959,840 A | 9/1990 | Akins et al. ................... | 372/57 |
| 5,018,161 A | 5/1991 | Akins et al. ................... | 37/57 |
| 5,023,884 A | 6/1991 | Akins et al. ................... | 372/57 |
| 5,025,445 A | 6/1991 | Anderson et al. ............. | 372/20 |
| 5,025,446 A | 6/1991 | Kuizenga ..................... | 372/21 |
| 5,070,513 A | 12/1991 | Letardi ........................ | 372/83 |
| 5,187,716 A | 2/1993 | Haruta et al. ................. | 372/57 |
| 5,189,678 A | 2/1993 | Ball et al. ..................... | 372/28 |

(Continued)

OTHER PUBLICATIONS

Meriam Webster On Line Dictionary defining "shim" and "fairing".*

(Continued)

*Primary Examiner*—Wael Fahmy
*Assistant Examiner*—Hrayr A Sayadian (57) ABSTRACT

A pulsed gas discharge laser operating at an output laser pulse repetition rate of greater than 4 kHz and a method of operating same is disclosed which may comprise a high voltage electrode having a longitudinal extent; a main insulator electrically insulating the high voltage electrode from a grounded gas discharge chamber; a preionizer longitudinally extending along at least a portion of the longitudinal extent of the high voltage electrode; a preionization shim integral with the electrode extending toward the preionizer. The preionizer may be formed integrally with the main insulator. The preionization shim may substantially cover the gap between the electrode and the preionizer. The apparatus and method may comprise the high voltage electrode being disposed in an electrode receiving pocket in the main insulator and formed to present an elongated discharge receiving area facing another electrode within the gas discharge chamber, an aerodynamic fairing attached to the high voltage electrode and substantially closing the gas flow disturbance pocket and presenting an aerodynamically smooth surface to the gas flow.

9 Claims, 5 Drawing Sheets

U.S. PATENT DOCUMENTS

| | | | |
|---|---|---|---|
| 5,247,534 A | 9/1993 | Muller-Horsche | 372/58 |
| 5,313,481 A | 5/1994 | Cook et al. | 372/37 |
| 5,315,611 A | 5/1994 | Ball et al. | 372/56 |
| 5,359,620 A | 10/1994 | Akins | 372/58 |
| 5,373,523 A | 12/1994 | Fujimoto et al. | 372/59 |
| 5,448,580 A | 9/1995 | Birx et al. | 372/38 |
| 5,471,965 A | 12/1995 | Kapich | 123/565 |
| 5,535,233 A | 7/1996 | Mizoguchi et al. | 372/87 |
| 5,557,629 A | 9/1996 | Mizoguchi et al. | 372/87 |
| 5,586,134 A | 12/1996 | Das et al. | 372/38 |
| 5,763,930 A | 6/1998 | Partlo | 250/504 |
| 5,771,258 A | 6/1998 | Morton et al. | 372/57 |
| 5,771,259 A | 6/1998 | Dvorkin et al. | 372/57 |
| 5,818,865 A | 10/1998 | Watson et al. | 372/86 |
| 5,852,621 A | 12/1998 | Sandstrom | 372/25 |
| 5,863,017 A | 1/1999 | Larson et al. | 248/176.1 |
| 5,897,847 A | 4/1999 | Jursich et al. | 423/219 |
| 5,953,360 A | 9/1999 | Vitruk et al. | 372/87 |
| 5,978,394 A | 11/1999 | Newman et al. | 372/32 |
| 5,982,803 A | 11/1999 | Sukhman et al. | 372/87 |
| 5,991,324 A | 11/1999 | Knowles et al. | 372/57 |
| 6,005,879 A | 12/1999 | Sandstrom et al. | 372/25 |
| 6,016,325 A | 1/2000 | Ness et al. | 372/38 |
| 6,018,537 A | 1/2000 | Hofmann et al. | 372/25 |
| 6,028,880 A | 2/2000 | Carlesi et al. | 372/58 |
| 6,038,055 A | 3/2000 | Hansch et al. | 359/279 |
| 6,067,311 A | 5/2000 | Morton et al. | 372/57 |
| 6,094,448 A | 7/2000 | Fomenkov et al. | 372/102 |
| 6,104,735 A | 8/2000 | Webb | 372/37 |
| 6,128,323 A | 10/2000 | Myers et al. | 372/38 |
| 6,151,349 A | 11/2000 | Gong et al. | 372/58 |
| 6,164,116 A | 12/2000 | Rice et al. | 73/1.72 |
| 6,192,064 B1 | 2/2001 | Algots et al. | 372/99 |
| 6,208,674 B1 | 3/2001 | Webb et al. | 372/57 |
| 6,208,675 B1 | 3/2001 | Webb | 372/58 |
| 6,212,211 B1 | 4/2001 | Azzola et al. | 372/33 |
| 6,219,368 B1 | 4/2001 | Govorkov | 372/59 |
| 6,240,117 B1 | 5/2001 | Gong et al. | 372/58 |
| 6,314,119 B1 | 11/2001 | Morton | 372/57 |
| 6,317,447 B1 | 11/2001 | Partlo et al. | 372/57 |
| 6,330,261 B1 | 12/2001 | Ishihara et al. | 372/38.1 |
| 6,414,979 B2 | 7/2002 | Ujazdowski et al. | 372/87 |
| 6,466,602 B1 | 10/2002 | Fleurov et al. | 372/87 |
| 6,477,193 B2 | 11/2002 | Oliver et al. | 372/58 |
| 6,535,531 B1 | 3/2003 | Smith et al. | 372/25 |
| 6,549,551 B2 | 4/2003 | Ness et al. | 372/38.07 |
| 6,567,450 B2 | 5/2003 | Myers et al. | 372/55 |
| 6,570,899 B1 | 5/2003 | Yabu et al. | 372/50 |
| 6,625,191 B2 | 9/2003 | Knowles et al. | 372/55 |
| 6,654,403 B2 | 11/2003 | Ujazdowski et al. | 372/87 |
| 6,690,704 B2 | 2/2004 | Fallon et al. | 372/58 |
| 6,693,939 B2 | 2/2004 | Klene et al. | 372/58 |
| 6,704,339 B2 | 3/2004 | Lublin et al. | 372/57 |
| 6,704,340 B2 | 3/2004 | Ershov et al. | 372/58 |
| 6,810,061 B2 | 10/2004 | Hori et al. | 372/87 |
| 2002/0191661 A1* | 12/2002 | Morton et al. | 372/55 |
| 2003/0012234 A1 | 1/2003 | Watson et al. | 372/25 |
| 2003/0031216 A1 | 2/2003 | Fallon et al. | 372/29.01 |
| 2003/0138019 A1 | 7/2003 | Rylov et al. | 372/58 |

OTHER PUBLICATIONS

Miriam-Webstrer On-Line Dictionary entry defining "contact."*
Nguyen, Thinh et al., "Diffusion Bonding An Advanced Material Process for Aerospace Process for Aerospace Technology", http://www.vacets.org/vnc97/ttnguyen.htm.

* cited by examiner

HIGH PULSE REPETITION RATE GAS DISCHARGE LASER

RELATED APPLICATIONS

The present application is related to U.S. patent application Ser. No. 10/877,737, entitled HALOGEN GAS DISCHARGE LASER ELECTRODES, filed on Jun. 25, 2004, and of Ser. No. 10/815,387, entitled GAS DISCHARGE LASER CHAMBER IMPROVEMENTS, filed on Mar. 31, 2004, the disclosures of which are hereby incorporated by reference.

FIELD OF THE INVENTION

The present invention related to high pulse repetition rate, e.g., 4 kHz and above gas discharge laser systems, e.g., excimer and molecular fluorine laser or $CO_2$ systems.

BACKGROUND OF THE INVENTION

Gas discharge lasers, e.g., KrF, ArF, $F_2$, XeF, XeCl, $CO_2$ and the like laser systems operating at pulse repetition rates of up to 6 kHz and above present certain operational problems, related, in part, to disturbances to the gas flow circulating around the lasing medium containing chamber, and particularly in the vicinity of the high repetition rate gas discharges occurring between elongated gas discharge electrodes as such electrodes are well known in the art. Applicants propose certain improvements and modifications to existing assemblies comprising, e.g., electrodes, a preionizer(s), a main insulator(s) and electrode supports.

SUMMARY OF THE INVENTION

A pulsed gas discharge laser operating at an output laser pulse repetition rate of greater than 4 kHz and a method of operating same is disclosed which may comprise a high voltage electrode having a longitudinal extent; a main insulator electrically insulating the high-voltage electrode from a grounded gas discharge chamber; a preionizer longitudinally extending along at least a portion of the longitudinal extent of the high voltage electrode; a preionization shim integral with the electrode extending toward the preionizer. The preionizer may be formed integrally with the main insulator. The preionization shim may substantially cover the gap between the electrode and the preionizer. The apparatus and method may further comprise a high voltage electrode; a main insulator insulating the high voltage electrode from a grounded gas discharge chamber; the high voltage electrode being disposed in an electrode receiving pocket in the main insulator and formed to present an elongated discharge receiving area facing another electrode within the gas discharge chamber, with adjacent side surfaces of the high voltage electrode slanting away from an outer extent of side walls of the pocket in the longitudinal extent of the pocket and the high voltage electrode, forming a gas flow disturbance pocket; an aerodynamic fairing attached to the high voltage electrode and substantially closing the gas flow disturbance pocket and presenting an aerodynamically smooth surface to the gas flow. The main insulator may be formed to present an aerodynamically smooth face in the direction of the gas flow and the fairing aerodynamically smooth surface being generally aligned with the main insulator aerodynamically smooth surface. The aerodynamic fairing may be on one side of the elongated discharge receiving area and a preionizer may be positioned on the other side of the elongated discharge receiving area. The one side is the downstream side or the upstream side. The aerodynamic fairing may comprise a pair of aerodynamic fairings one on each side of the elongated discharge receiving area. The apparatus and method may comprise an aerodynamic block presenting an extension of the aerodynamically smooth surface of the main insulator. The high voltage electrode may be formed with an integral shim extending toward the preionizer and presenting an aerodynamically smooth surface to the gas flow. The apparatus and method may further comprise an elongated electrode support bar formed to have an elongated dugout portion; an elongated electrode attached to the electrode support bar in the elongated dugout portion; an upstream fairing positioned in the elongated dugout portion presenting with the electrode support bar and electrode an aerodynamically smooth surface to a gas flow past the electrode. The apparatus and method may further comprise a downstream fairing positioned in the elongated dugout portion presenting with the electrode support bar and the electrode an aerodynamically smooth surface to a gas flow past the electrode.

DETAILED DESCRIPTION OF PREFERRED EMBODIMENTS

In order to allow for higher repetition rate operation of, e.g., gas discharge lasers, e.g., excimer lasers, such as ArF, KrF, XeF, and XeCl lasers, or $F_2$ lasers or $CO_2$ lasers or the like, e.g., at laser output light pulse repetition rates of up to and exceeding 6 kHz, applicants had expected that the blower motor speed would have to increase about 50% above those needed for currently used lasers of such a type at around 4 kHz pulse repetition rates. This can create a need for tremendously higher blower power, increasing on the order of as the cube of the speed increase. According to aspects of embodiments of the present invention applicants propose certain improvements to the flow path of the laser gas being moved by the blower motor within the laser chamber in order to reach the required gas flow amounts (basically gas flow speed, although those skilled in the art will realize that the flow speed is not a constant either in the elongated longitudinal electrode axis direction or a direction perpendicular to that direction, due, e.g., to flow restriction of surrounding components, flow resistance at the boundaries of the flow region, etc.).

In the past such parameters as arc free blower speed ("AFBS") have been measured to determine, e.g., the blower speed needed. The blower speed necessary is determined to be able to move sufficient gas away from the discharge region between the elongated electrodes in such devices. This is necessary to on the one hand assure the next sequential discharge is a good one (maintains the same laser output light energy for a given applied voltage through the discharge formed lasing medium) because the gas through which the discharge occurs to form the lasing medium is "fresh". On the other hand the gas flow sufficiency is determined by being able to avoid arcing between one of the electrodes and the grounded chamber walls or between electrodes through ions present in the gas through which the prior discharge occurred between the electrodes. If such ions remain close enough to the electrodes to form an electrical path to the chamber wall at the time when the high voltage one of the electrodes is raised in voltage to ultimately cause the discharge through the lasing medium laser gas such arcing can occur. The latter effect also, among other things, results in instability of the laser output light pulse energy from pulse to pulse.

Figure 1:
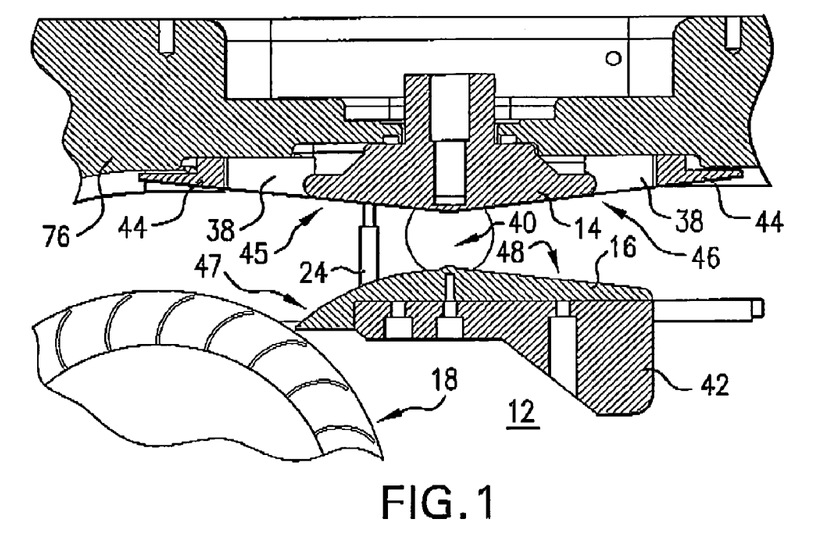
FIG. 1 shows a cross-sectional view orthogonal to a longitudinal extension of electrodes in a gas discharge laser according to aspects of an embodiment of the present invention according to which ideal or optimized gas flow through the gas discharge region between the electrodes of such a gas discharge laser were tested.
Figure 9:
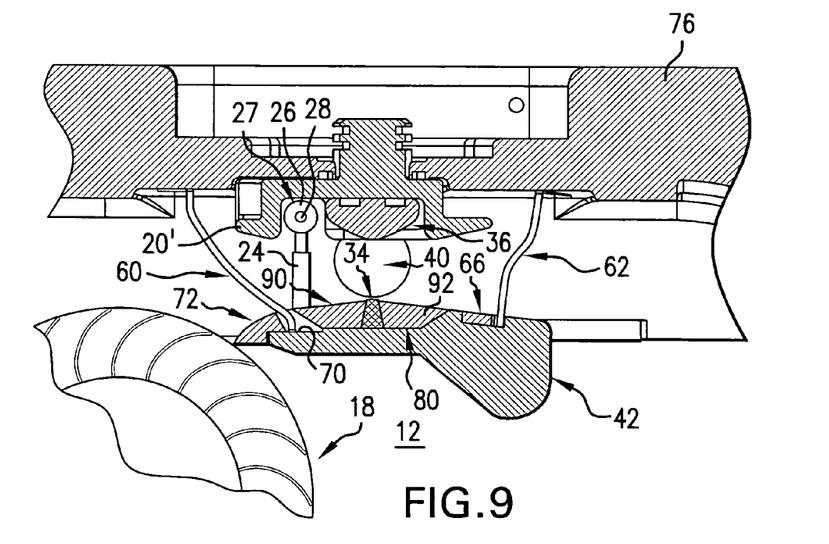
FIGS. 9-11 show cross-sectional views at different points along the elongated extent of the electrodes of a gas discharge laser in which the other of the electrodes and its mounting and fairings are formed according to aspects of an embodiment of the present invention for more optimized or idealized aerodynamic gas flow performance.

FIG. 1 shows a cross-sectional view of a test fixture that applicants used to test the gas flow properties of an "idealized" flow path for the gas through the discharge region in the gap 40 between electrodes, which are, along with surrounding elements simulated by a cathode blank 14 and an anode blank 16. The cathode blank 14 simulates an existing cathode and adjacent portions of a main insulator 20 (shown in FIG. 2) without gaps that have traditionally been present in such assemblies, e.g., as shown in FIG. 9 around the cathode 36. In addition flow smoothing blocks 44 were inserted to fill in a region on either side of the lateral extent of the main insulator 20, which openings are also shown in FIG. 9 in the vicinity of either side of the main insulator 20. The flow smoothing blocks 44 contain a plurality of narrow slits 38 that allow for the current returns to pass through the smoothing blocks 44.

Figure 10:
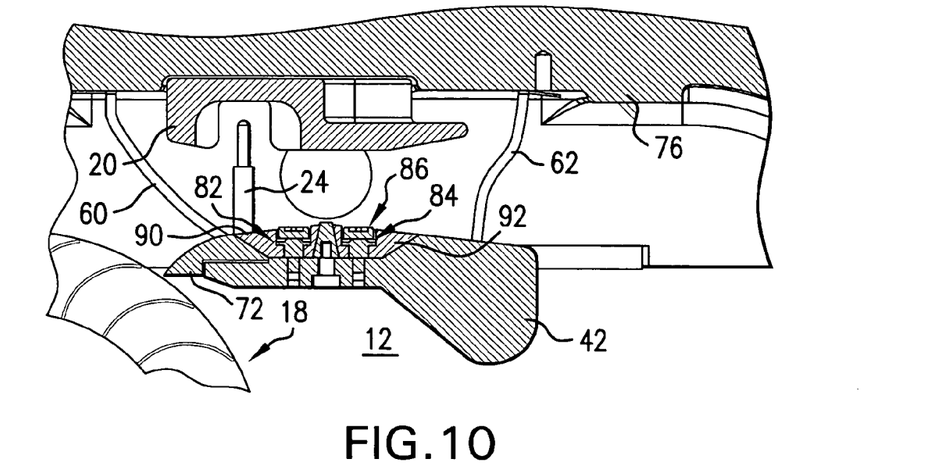
Figure 11:
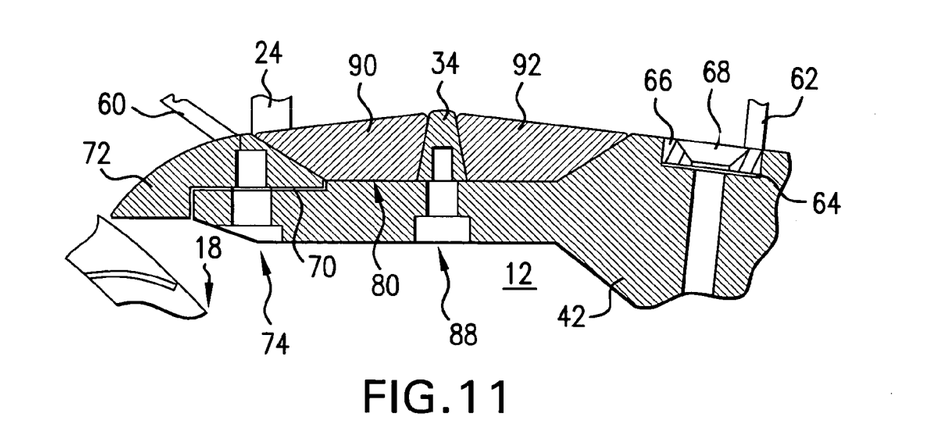
Figure 12:
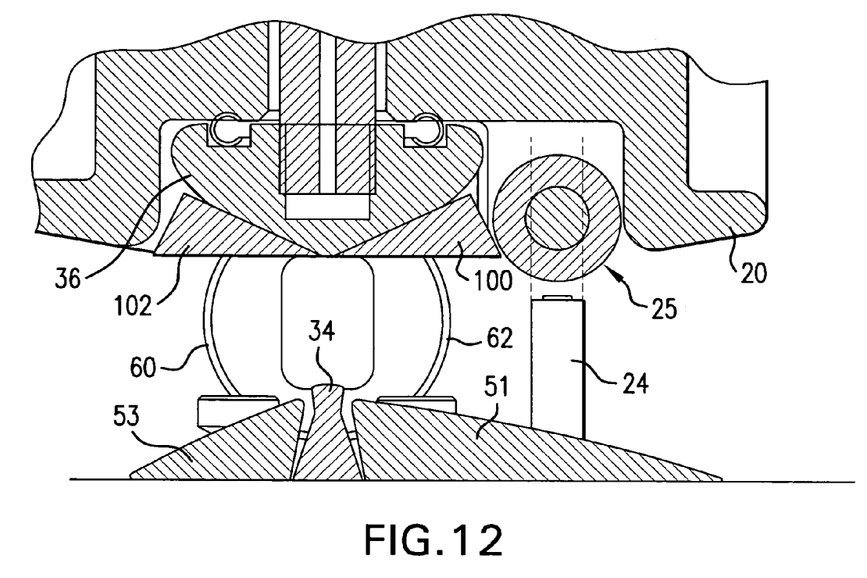
FIGS. 12 and 13 show aspects of embodiments of the present invention in which an electrode has a pair of fairings on either side of a discharge receiving portion of the electrode.
Figure 13:
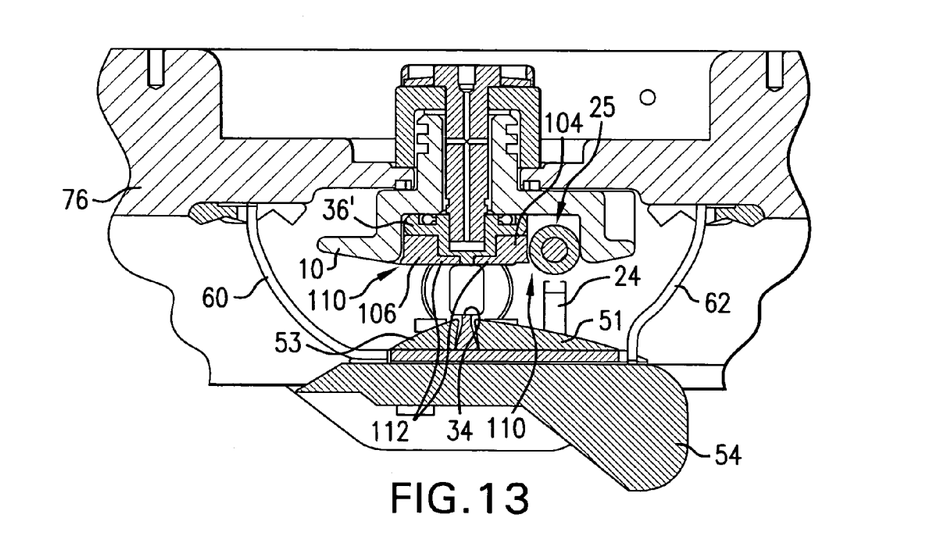

Applicants found that this "idealized" gas flow path including an essentially uniform upper inlet gas flow surface 45 and upper exit gas flow surface 46 in combination with respective opposite lower inlet gas flow surface 47, which may correspond to an arcuate shaped surface, e.g., formed by an anode fairing or a portion of an anode support bar 42 and an exit gas flow surface formed, e.g., by an downstream anode fairing, e.g., as shown in FIGS. 12 and 13 or by a portion of the anode support bar itself, as shown, e.g., in FIGS. 9-11 and discussed below.

Applicants found that measured gas flow speeds were indicative of the fact that the necessary blower speed with such an aerodynamically "idealized" gas flow path for, e.g., an increase in pulse repetition rate by 50% from 4 kHz to 6 kHz, was achievable and not the expected 50% increase in blower speed with the concomitant increase in required blower power supply. The idealized smooth upper and lower surfaces remove, e.g., the effects of turbulence and flow separation created, e.g., by gaps between components of the laser system in the vicinity of the discharge region 40 and/or otherwise in the gas flow path from the blower 18 to the portion of the lasing chamber 12 beyond the downstream extent of the anode support bar 42. They reduce the amount of turbulence, flow separation, eddies, and the like in the gas flow through the discharge region 40.

Figure 2:
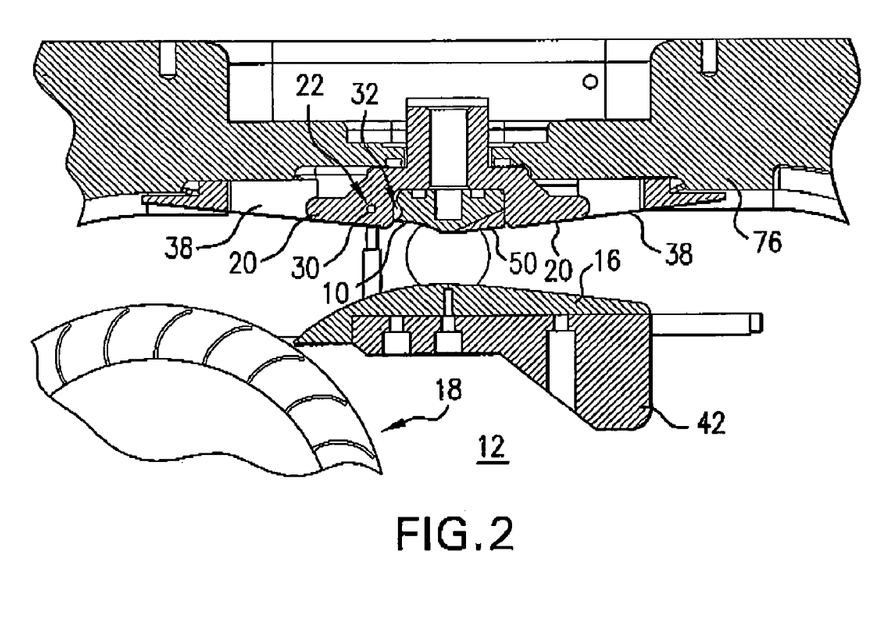
FIG. 2 shows the cross-sectional view of the apparatus of FIG. 1 with gas discharge electrical components formed to closely approximate the ideal or optimized flow conditions according to aspects of an embodiment of the present invention.
Figure 3:
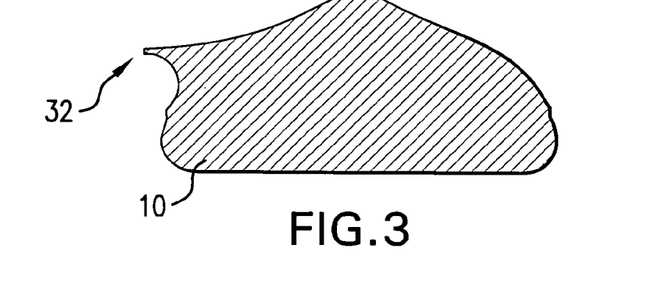
FIGS. 3 and 4 show cross sectional views of a shimmed electrode according to aspects of an embodiment of the present invention.
Figure 4:
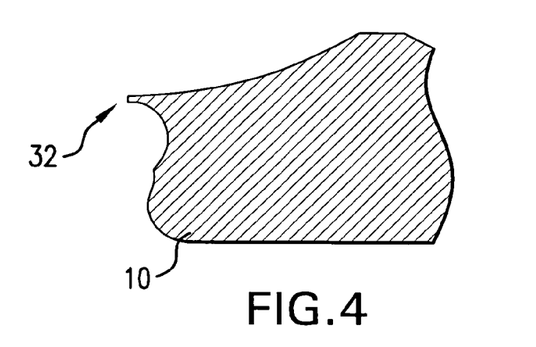

As can be seen from the illustrative partly schematic view in FIG. 2 according to aspects of an embodiment of the present invention, within the requirements for using separate parts, e.g., the cathode 10 and main insulator 20, the preionizer 25, current returns 60, 62, and the like, due, e.g., to their electrical, manufacturing, mechanical and structural properties and requirements, applicants propose according to various aspects of the present invention to provide a more aerodynamic gas flow path from the blower 18, through the gas discharge region 40 and past the anode and its fairings into the portion of the chamber 12 beyond the anode support bar 42.

According to aspects of embodiments of the present invention this may include an integral cathode shim 10 and the cathode fairing 50. A main insulator 20 may have a through hole 22 for a ground rod for integral preionizer ("PI") 30 operation. The integral shim 32 on the cathode 10 may be specifically shaped, e.g., not only to provide the pre-ionization function of bringing the high voltage on the cathode to the vicinity of the preionizer 25 ground rod 30, but also to shape/steer the gas flow efficiently toward the discharge region 40 between the electrode gap. In this manner, the traditional gap between the cathode 36, e.g., as shown in FIG. 9, and main insulator 20 and preionizer (where the preionizer 25 is an upstream preionizer 25, e.g., as shown in FIGS. 9 and 10, and providing a surface exposed to the passing gas flow that is more like the aerodynamically smooth portion of the surface 45 in the "idealized" gas flow path of FIG. 1.

Since downstream flow separation on the anode assembly has been shown to increase the arc-free blower speed, according to aspects of an embodiment of the present invention a commensurate downstream/fastback fairing 51 (as shown in FIGS. 12 and 13 on the anode 42 may be matched with as a corresponding downstream/fastback fairing 50 for the cathode 10. The cathode fairing 50, as is the anode fairing 51, may be made of an insulator, e.g., of the same ceramic material as is the main insulator 20.

Figure 5:
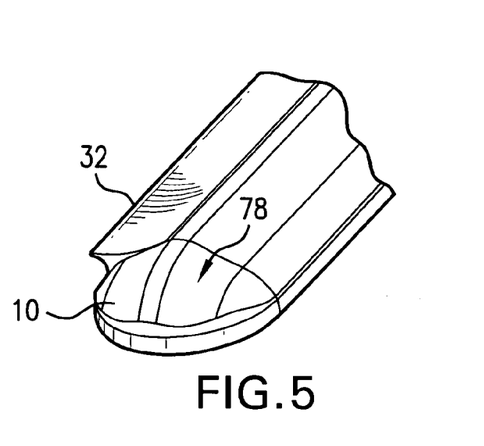
FIG. 5 shows a perspective orthogonal view of a portion of a shimmed electrode according to aspects of an embodiment of the present invention.
Figure 6:
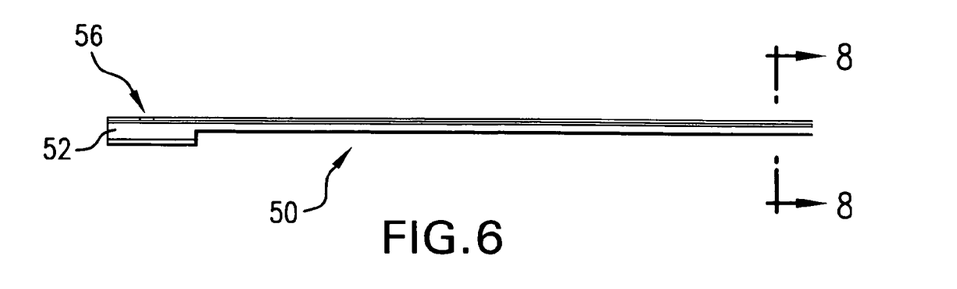
FIGS. 6 and 7 show a side view of an electrode fairing according to aspects of an embodiment of the present invention.
Figure 7:
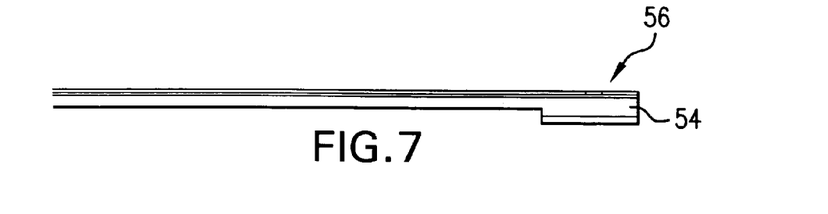
Figure 8:
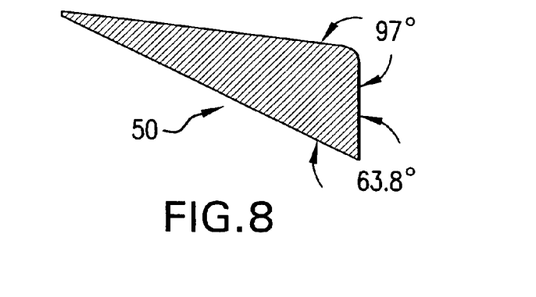
FIG. 8 shows a cross-sectional view of the electrode fairing of FIGS. 6 and 7 at cross-sectional lines 8-8 in FIG. 6.

Previously, this might have been implemented by complex machining of the cathode and fairing and bolting them together to retain the cathode's original shape. According to aspects of an embodiment of the present invention the cathode fairing 50 may be, e.g., a ceramic part, in the shape of a wedge 50, e.g., as shown in FIGS. 6 and 7. This wedge 50 with two integral mounting pads 52, 54 outboard of the cathode 10 (in the elongated direction) may then be affixed to the main insulator 20 or to the upper chamber half 76, e.g., with ceramic screws or metal screws like the anode fairing 51. Alternatively, a rounded portion 78 of the cathode, as illustrated, e.g., in FIG. 5 with respect to the shimmed cathode 10, may be partially machined away and the mounting pads 52, 54 attached there with metal or ceramic screws.

In addition, the gas flow blocks 38 and current return attachment plate fairings which were part of the testing fixture of FIG. 1 may also be included in the embodiment of FIG. 2 to further give the effect of the "idealized" gas flow passage across the upper inlet and exit surfaces of the gas flow path past the electrodes, in order to make them more closely approach the aerodynamically smooth surfaces of the "idealized" gas flow passage of FIG. 1.

As shown in FIGS. 12 and 13, the cathode fairing may be used on both sides of the cathode 36, with the wedge shaped fairings 100, 102 similar to the one shown in FIG. 2, as shown in FIG. 12, and more rectangularly shaped fairings 104, 106 shown in FIG. 13. These fairings 104, 106, as illustrated, may, e.g., have noses 110 shaped to more conform to rounded edges of, e.g., the preionizer 25 on the upstream or downstream side, if any, or the main insulator 20 on either the upstream side or downstream side, or both, as applicable, and with flat protrusions 112 extending toward the discharge receiving portion of the cathode 36'.

According to aspects of an embodiment of the present invention the gas flow in the vicinity of the discharge region 40 may be further improved by approaching an idealized flow region while maintaining the necessary distinct nature of certain parts, e.g., because they are made of different materials or are not easily fabricated as a single piece, etc. The effects of turbulence and aerodynamic drag and eddy forming protrusions in the neighborhood of the discharge region 40, among other things which impact the gas flow properties, and, therefore, also the AFBS for a given configuration and repetition rate, can be significantly ameliorated on the side of the other electrode, as well as the side of the cathode as noted above.

In the past, the anode support bar in lasers sold by applicants' assignee, Cymer, Inc., e.g., models 6XXX and 7XXX laser systems, have had an anode support bar 54 with a flat upper surface, such as illustrated in FIGS. 1, 2, 12 and 13, to which have been attached an anode 34 and anode fairings 51, 53. The flow shaping fairings 51, 53 and anode 34 itself, extending above the anode support bar 42, have been shown to also provide locations for drag, turbulence and flow separation, etc.

These can be substantially eliminated by, e.g., providing an anode support bar 42 such as illustrated in FIGS. 9, 10 and 11, wherein, e.g., the upper surface is not flat, but is shaped for flow aerodynamics, and contains, e.g., a dugout region 80 into which may be inserted anode 34 and upstream fairing 90 and downstream fairing 92. In this manner, the entire anode assembly can be made to present a more seamless aerodynamic flow profile to the gas flow through the discharge region 40. The front portion 72 of the anode support bar 42 forming a cutoff for the blower fan 18 may be made of separate piece as a manufacturing convenience to allow for the attachment of the upstream current returns attached to an attachment strip 70 that is secured between the front portion piece 72 and the anode support bar 42 with the front cutoff portion 72 attached to the anode support bar by screws 74. However, for purposes of the present application, according to aspects of embodiments of the present invention it may be considered part of the anode support bar 42.

The downstream current return tines 62 may be fastened to the anode support bar 42 by a strip 64 held in place by a clamp plate 66 attached to the anode support bar 42 by screws 68. The fairings 90, 92 may be connected to the anode support bar by screws 86, with the upstream fairing having a brass washer 82 and the downstream fairing having a crescent washer 84. The washers may be alternated from side to side along the length of the electrode fairings 90, 92.

To allow for higher repetition rate laser operation without the need for tremendously higher blower power, applicants also propose to replace a blade/dielectric electrode, e.g., an anode as originally designed and now implemented in certain laser products of the applicants assignee, Cymer, Inc., e.g., models 6X10 and 7000, with the anode extending in height above the adjacent fairings. This was done at least in part to ensure a properly attached discharge even after the anode had worn down after some use. But at higher rep rates up to and above 6 kHz applicants have discovered a flow penalty is paid for this protrusion into the gas flow. Applicants have also discovered that reefing electrodes that develop a natural reef from the reaction of lasing gas, e.g., fluorine with material in the electrode with exposure to the lasing medium in the lasing gas caused by high voltage discharge between the electrodes in the laser system or which are provided with an artificial reef there is very little or non-existent wear over electrode life. Therefore, according to aspects of an embodiment of the present invention applicants propose to, e.g., have the electrode, e.g., the anode height matched with the fairing height, or perhaps even slightly lower than the fairing height to allow for the reef to grow where the electrode and the type of laser system naturally grow reef coatings to allow the reef coating to extend essentially to the fairing height. For example, as illustrated in FIGS. 9-11 the anode can be "even with" the adjacent fairing(s) when it is, e.g., within about ±0.5 μm from the highest extension of the respective fairing(s), which may also be true for other embodiments with non-reefing electrodes being "even with" the fairing height(s).

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In addition to changes and modifications to the disclosed and claimed aspects of embodiments of the present invention(s) noted above the others could be implemented.

While the particular aspects of embodiment(s) of the HIGH PULSE REPETITION RATE GAS DISCHARGE LASER described and illustrated in this patent application in the detail required to satisfy 35 U.S.C. §112 are fully capable of attaining any above-described purposes for, problems to be solved by or any other reasons for or objects of the aspects of an embodiment(s) above described, it is to be understood by those skilled in the art that the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present HIGH PULSE REPETITION RATE GAS DISCHARGE LASER is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

We claim:

1. A gas discharge laser device comprising:
a discharge chamber;
a first electrode having a discharge surface;
a second electrode spaced from the first electrode to establish a discharge region therebetween;
a gas flow passing through the discharge region;
a main insulator electrically insulating the high voltage first electrode from the discharge chamber;
a preionizer extending to a terminus portion positioned in the gas flow;
a preionization shim electrode from the discharge surface of the first electrode to an edge in the vicinity of the preionizer terminus portion to present an aerodynamically smooth surface to the gas flow between the preionizer and the discharge surface.

2. A device as recited in claim 1 wherein the preionizer is formed integrally with the main insulator.

3. A device as recited in claim 1 wherein the preionizer shim is formed integrally with the first electrode.

4. A device as recited in claim 1 wherein the first electrode is elongated and the edge extends in the direction of electrode elongation.

5. A device as recited in claim 1 wherein the preionizer shim is a fairing attached to the first electrode.

6. A device as recited in claim 5 wherein the fairing is made of an insulating material.

7. A device as recited in claim 1 wherein the preionizer comprises a cylindrical ceramic tube and a conductive ground rod.

8. A device as recited in claim 1 wherein the preionizer is positioned in the gas flow upstream of the discharge region.

9. A device as recited in claim 1 wherein the preionizer is positioned in the gas flow downstream of the discharge region.

* * * * *

UNITED STATES PATENT AND TRADEMARK OFFICE
CERTIFICATE OF CORRECTION

PATENT NO. : 7,633,989 B2
APPLICATION NO. : 11/169203
DATED : December 15, 2009
INVENTOR(S) : Walter D. Gillespie et al.

It is certified that error appears in the above-identified patent and that said Letters Patent is hereby corrected as shown below:

Column 7:
Line 17, after "insulating the" delete the words "high voltage".

Line 21, after "shim" delete "electrode" and insert --extending--.

Signed and Sealed this

Second Day of March, 2010

David J. Kappos
*Director of the United States Patent and Trademark Office*